Aug. 2, 1960 H. C. ALEXANDER ET AL 2,947,956

FLUID COOLED ENERGY TRANSMISSION CONTROL DEVICE

Filed July 3, 1957

INVENTOR.
HERBERT C. ALEXANDER
HAROLD HEINS
BY
Edgar J. Rost
ATTORNEY

INVENTOR.
HERBERT C. ALEXANDER
HAROLD HEINS
BY
Edgar J. Rost
ATTORNEY

FLUID COOLED ENERGY TRANSMISSION CONTROL DEVICE

Filed July 3, 1957 3 Sheets-Sheet 3

INVENTOR.
HERBERT C. ALEXANDER
HAROLD HEINS
BY Edgar O. Rost
ATTORNEY

United States Patent Office 2,947,956

Patented Aug. 2, 1960

1

2,947,956

FLUID COOLED ENERGY TRANSMISSION CONTROL DEVICE

Herbert C. Alexander, Peabody, and Harold Heins, Marblehead, Mass., assignors to Bomac Laboratories Inc., Beverly, Mass., a corporation of Massachusetts Filed July 3, 1957, Ser. No. 669,729

3 Claims. (Cl. 333—98)

The present invention relates to electromagnetic energy transmission control devices and more particularly to such devices capable of being operated at extremely high transmitter power levels heretofore unattainable with prior art devices.

Copending patent application Serial No. 663,536 filed June 4, 1957, by Ray S. Braden and assigned to the assignee of the present invention discloses a novel electrodeless gaseous discharge device for rapid switching of high power electromagnetic energy in microwave radar systems during the transmitting and receiving cycles. The device disclosed therein provides a tubular element of folded cylinder construction comprising two spaced dielectric cylinders joined together at the ends to form a vacuum tight envelope. By means of controlling the spacing between the cylinders and the gaseous atmosphere contained therein, the resultant gaseous discharge will provide dependable means for switching energy propagated in a radar system. The device is particularly suited for extremely high power applications in the order of one million watts (one megawatt) or higher. Selection of such materials as ceramic or quartz will enable the cylinder to withstand high thermal shock and intense heat accompanying such high power gaseous discharges. The construction of the cylinder provides still further means for dissipating heat generated in such discharges.

It is an object of the present invention to provide a novel electromagnetic energy control device embodying a plurality of folded gas cylinder elements disposed within a waveguide structure.

A further object is to provide a novel electromagnetic energy control device particularly suited for high transmitter power applications by incorporating means for rapid dissipation of heat within the device.

A still further object is to provide an electromagnetic energy control device with circulating cooling means incorporated therein to permit operation at extremely high transmitter power levels.

The objects enumerated above may be attained by means of positioning a series of folded type gas cylinders fabricated in accordance with the teachings of the cited patent application within a section of conventional waveguide. One possible configuration of cylinders is disclosed, however, many alternative arrangements will occur to persons skilled in the art. The cylinder arrangement extends parallel to the E vector or point of high electric field concentration of the electromagnetic waves propagated in a radar system. This configuration will distribute the total heat energy dissipated over a greater area and also reduce the total current being carried by any one discharge tube.

A feature of the invention resides in the provision of structure to contain a cooling liquid which may be circulated around the gas cylinders to carry away high heat. Since the liquid medium will necessarily flow in the region traversed by electromagnetic waves a suitable liquid

2 having a low dielectric constant may be employed without materially altering the transmission characteristics of the waveguide. Many such liquids are available commercially and a partial listing is included in the detailed description of the invention. The coolant may be circulated through an external heat exchanger in a self contained system.

The structure disclosed herein has been successfully incorporated in a conventional duplexer system in series between two hybrid junctions to control higher power levels than heretofore handled with conventional switching devices.

Other features and advantages will become apparent after consideration of the following detailed description and appended drawings, in which.

Figure 1:
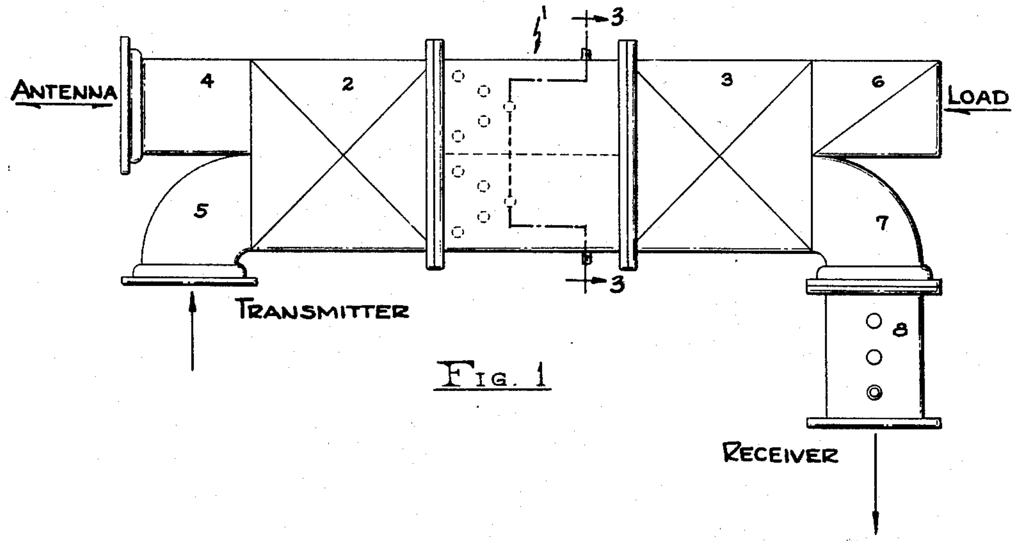
Fig. 1 is a plan view of a complete duplexer system incorporating an embodiment of the invention.

Referring now to the drawings Fig. 1 illustrates a broadband balanced duplexer commonly employed in radar systems. An example of such a system employing a dual transmit-receive tube is shown in U.S. Patent No. 2,710,932, issued to H. Heins and assigned to the assignee of the present invention. Further information as to the theory of operation of such systems may be obtained from the publication Electronics, McGraw-Hill Publishing Co., New York, N.Y., August 1954, pp. 149-151.

The embodiment of the present invention may be incorporated in such systems with a minimum of structural rearrangement when higher transmitter power levels are handled which are beyond the capabilities of conventional transmit-receive devices. Such a system comprises the improved device shown generally at 1 mounted in series between waveguide hybrid junctions 2 and 3 of the type disclosed in U.S. Patent 2,739,287, issued March 20, 1956, to Henry J. Riblet. With this system appropriate waveguide plumbing is provided in arm 4 to connect to the antenna; arm 5 to the transmitter; and arm 6 to a low-power matched termination. Arm 7 couples the duplexer to the receiver branch of the circuit. By employing the embodiment of the invention, however, the exceedingly high transmitter power levels are attenuated to a value within the tolerable limits of conventional transmit-receive tube structures. Hence, the so-called TR tube 8 may now be mounted immediately preceding the receiver component of the circuit for additional protection. In an illustrative embodiment, device 1 was employed in a system with a transmitter power level of over 5,000 kilowatts. ATR tube 8 could then be employed having a power level rating of up to 50 kilowatts as further protection for the receiver.

Figure 2:
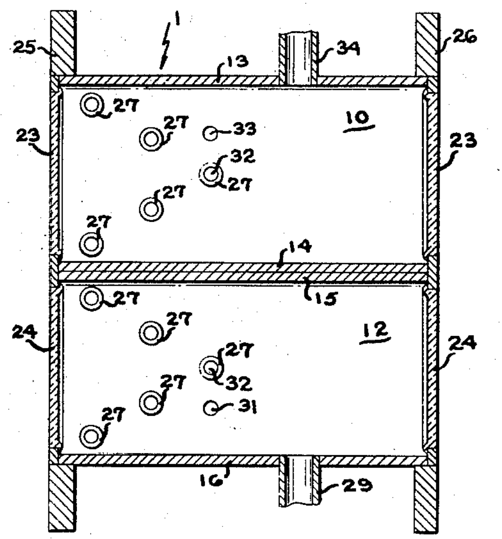
Fig. 2 is detailed top cross sectional view of the embodiment with the upper half removed to expose internal structure.
Figure 3:
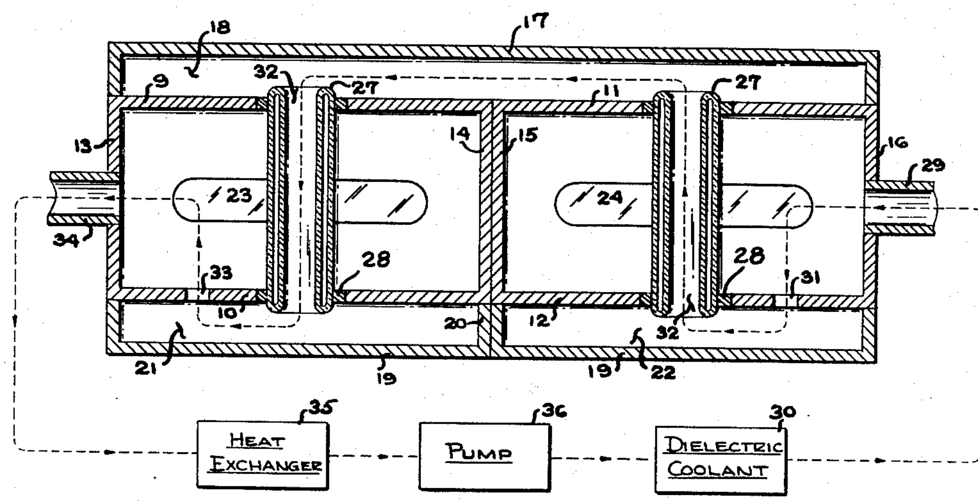
Fig. 3 is a detailed cross sectional view taken along the line 3—3 in Fig. 1.

The device 1 will now be described by referring to Figs. 2 and 3. The envelope comprises two mutually parallel sections of hollow-pipe waveguide having broad walls 9, 10, 11 and 12 and narrow walls 13, 14, 15 and 16 with said sections joined together along narrow walls 14 and 15. Secured to the outer peripheral edge of walls 9 and 10 is a cover member 17 defining with said walls a chamber 18. The opposed walls 10 and 12 are similarly enclosed by cover members 19, each being approximately one-half the dimensions of cover 17 to define therebetween a connon partition 20 extending throughout the length of the joined sections. Two chambers 21 and 22 will thereby be defined by this described wall structure. The ends of each section of wave guide are enclosed by means of dielectric windows 23 and 24 to provide a fluid tight structure. Flanges 25 and 26 provide means for mounting the device in adjacent waveguide structure.

We next provide an array of folded gas-filled cylinders 27 in each waveguide section fabricated in accordance with the teachings of the copending patent application Serial No. 663,536, filed on June 4, 1957, now U.S. Patent No. 2,922,124, by Ray S. Braden. The material selected for the cylinders is desirably quartz because of its high resistance to thermal shock due to a low coefficient of expansion. Pure argon gas at a pressure of approximately 4 millimeters of mercury has been experimentally used with notable results.

It will be noted that cylinders 27 are positioned parallel to the electric field of the electromagnetic energy propagated in the system. Due to the intensity distribution of this field the V-shaped configuration in each array will provide optimum results desired. The cylinders are mounted simply by providing suitable openings in the walls 9 and 11 and 10 and 12 and securing the cylinders therein. Since the waveguide structure is generally composed of brass metal, it may be desirable to provide intermediate metal inserts 28 as shown in Fig. 3 of a metal having a low coefficient of expansion, such as Invar to assure intimate electrical contact over a wide temperature range.

Means for circulating a cooling liquid around the gaseous discharge elements 27 are provided. An inlet port 29 in wall 16 may be coupled to a supply of a dielectric coolant schematically represented as at 30. Aperture 31 in bottom wall 12 permits the cooling liquid to enter chamber 22. Axial passageway 32 provided in each of the cylinders 27 allows the circulating liquid to come in contact with the areas of intense ionization and then flow into upper chamber 18. From this chamber the liquid flows down through the passageways 32 in the second array of cylinders to the lower chamber 21. Aperture 33 in wall 10 provides for egress to outlet port 34. To reduce the temperature of the circulating liquid a heat exchanger represented at 35 may be provided. A conventional circulating pump 36 completes the system for removal of heat from the discharge area by the liquid coolant.

In the selection of the coolant, the prime consideration will be the dielectric constant and loss tangent of the fluid since the internal waveguide structure is utilized for propagation of electromagnetic energy. A list of possible dielectric coolants having desirable characteristics selected from the text "Dielectric Materials and Applications," A. R. Von Hippel, John Wiley and Sons, Inc. and Technology Press of M.I.T., 1954, pages 362–366 are shown below:

*Fluid coolants*

[All values at $3\times10^9$ CS]

| NAME | Dielectric Constant ($\epsilon_1/\epsilon_0$) | Loss Tangent ($\tan\delta\times10^{-4}$) |
|---|---|---|
| Heptane | 1.97 | 1.0 |
| Carbon Tetrachloride | 2.17 | 4.0 |
| Aviation Gas 100 Octane | 1.92 | 14.0 |
| Aviation Gas 91 Octane | 1.94 | 11.5 |
| Bayol D | 2.06 | 13.3 |
| Bayol F | 2.13 | 10.5 |
| Marcol | 2.14 | 9.7 |
| Bayol | 2.14 | 9.3 |
| Bayol-16 | 2.15 | 9.9 |
| Fractol | 2.17 | 7.2 |
| Primol D | 2.17 | 7.7 |
| Diala Oil 15 | 2.16 | 13.4 |

Figure 4:
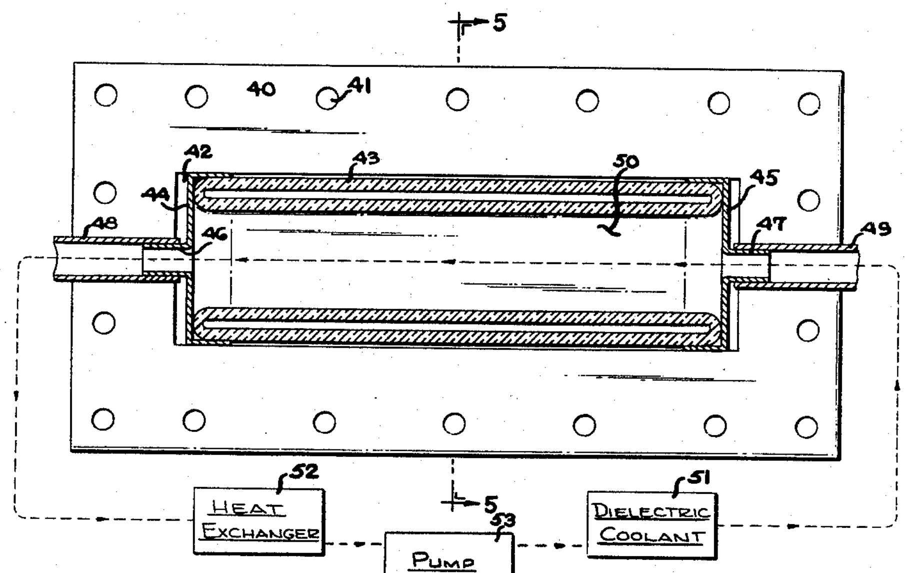
Fig. 4 is an alternative embodiment of the invention partly in section.
Figure 5:
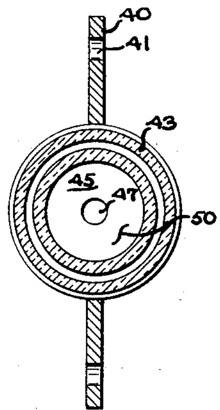
Fig. 5 is a detailed cross sectional view taken along the line 5—5 in Fig. 4.

Another embodiment of the invention is shown in Figs. 4 and 5 and is designed for applications utilizing lower transmitter power levels still outside the limits of prior art TR devices. The embodiment may be mounted directly in a waveguide system between suitable flanges with the folded gas cylinder extending transversely across the guide. It is also possible to mount any desired number of these single elements in series with sections of waveguide of predetermined length interposed in between the units.

A mounting plate 40 with mounting holes 41 circumferentially disposed therein has a centrally located aperture 42 having approximately the same inside dimensions as the waveguide plumbing employed in the system. The folded gas cylinder element 43 is supported within aperture 42 by means of end caps 44 and 45. Each end cap has a hollow tube 46 and 47 positioned therein for communication with suitable conductors 48 and 49 connected to a fluid circulating system to flow a dielectric fluid through the axial passageway 50 in cylinder 43. A reservoir 51 for the coolant, heat exchanger 52 and pump 53 comprise the self-contained circulating system.

Figure 6:
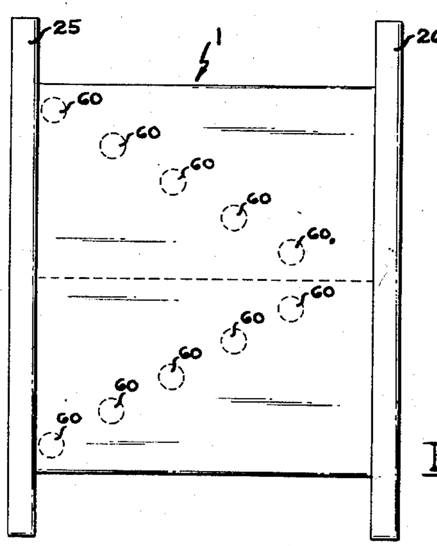
Fig. 6 is a plan view of a modification of the embodiment of the invention shown in Fig. 1.

An alternative array of cylinders for use in the dual guide system is illustrated in Fig. 6. In all respects the device is similar to the structure shown in Figs. 1–3, with the exception of the placement of the cylinders. In this instance the cylinders 6 in each section of waveguide are positioned diagonally to form collectively a V-configuration instead of a smaller V-configuration within each guide section.

It will be evident that various other modifications or alterations may be possible in the practice of the invention. The appended claims, therefore, should be interpreted to include such modifications or alterations as fall within the spirit and scope of the invention as defined.

What is claimed is:

1. In combination with a balanced duplexer electromagnetic microwave energy transmission system, a fluid cooled transmission control device comprising a plurality of joined mutually parallel sections of a hollow pipe rectangular waveguide having broad and narrow walls, an array of cylindrical electrodeless gaseous discharge elements positioned in each section in a substantially V-shaped configuration, said cylinders extending parallel to the electric field of the propagated energy, dielectric window members enclosing the ends of each waveguide section, metallic cover members spaced from the opposite broad walls of said joined waveguide sections to define hollow chambers, a fluid coolant having a low dielectric constant filling each waveguide section and hollow chambers and external means for circulating said fluid coupled to the outer narrow walls of said joined waveguide sections to thereby dissipate the heat generated within said discharge elements when ionized by high power electromagnetic energy propagated in the system.

2. The combination as claimed in claim 1 wherein said discharge elements in each waveguide section are positioned diagonally to the longitudinal axis thereof to define collectively an enlarged V-shaped configuration.

3. A fluid cooled electromagnetic microwave energy transmission control device comprising a section of rectangular hollow pipe waveguide having enclosure members at the ends thereof to provide a fluid tight envelope, a plurality of cylindrical electrodeless gaseous discharge elements positioned therein in a substantially V-shaped array along the waveguide longitudinal axis, each of said discharge elements having an axial hollow passageway therethrough, metallic cover members spaced from opposed broad walls of said waveguide section to define therebetween hollow chambers, a fluid coolant having a dielectric constant less than 2.2 filling said waveguide section, discharge element passageways and hollow chambers and external means for circulating said fluid coupled to said waveguide section.

References Cited in the file of this patent

UNITED STATES PATENTS

| | | |
|---|---|---|
| 1,196,474 | Nicolson | Aug. 29, 1916 |
| 2,519,795 | Smullin | Aug. 22, 1950 |
| 2,710,932 | Heins | June 14, 1955 |
| 2,879,487 | Fitzmorris | Mar. 24, 1959 |
| 2,884,602 | Speake | Apr. 28, 1959 |
| 2,884,603 | Bird | Apr. 28, 1959 |